Dec. 26, 1944.   F. C. OWEN   2,365,722
TRANSFORMER
Filed May 12, 1936
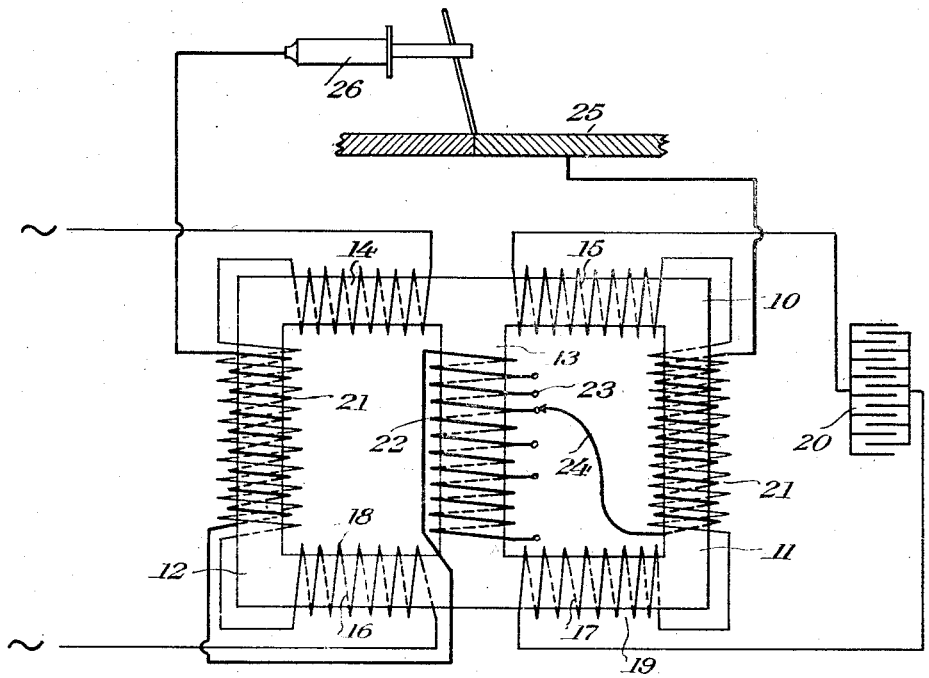
Frederick C. Owen
INVENTOR
ATTORNEY Patented Dec. 26, 1944

2,365,722

UNITED STATES PATENT OFFICE 2,365,722

TRANSFORMER

Frederick Carlisle Owen, Fayetteville, N. C.

Application May 12, 1936, Serial No. 79,367

5 Claims. (Cl. 171—119)

The object of the invention is to produce a transformer adapted for general application where a constant energy dissipation in the secondary for a given load is desired despite variations or fluctuations in the primary voltage; to provide a transformer particularly adapted for use in the art of welding, whereby separate pieces of metal can be fused together or deposited one on the other, or different metals fused together or deposited one on the other in such a way as to create an alloy of the two, and whereby similar or dissimilar metals can be welded without imperfections and without change in the structural characteristics, such as grain, hardness, ductility etc. of the deposited metal or the parent metal adjacent the weld, and whereby the heat fusing the parent metal is concentrated at the point of weld by reason of its being of sufficient intensity to fuse the parent metal before it can be dissipated to surrounding parts of the parent metal, and whereby metals can be fused together or deposited one on the other without gas and slag pockets, resultant oxide and other practical defects which at present attend the fusion of such metals, and whereby the fusing together of metals or the deposition of one on the other can be accomplished where they are submerged in fresh water or a saturated solution of salt water, and whereby the cutting operation of any metal may be carried out with the metal quickly dispersed from the line of cut to make the latter clean and free of any ragged condition, or a hole quickly burned through a metal with its diameter only slightly in excess of that of the electrode used, and whereby the welding, fusing or cutting of a metal may be carried out where water is forced by pressure across or merely flows across and in contact with the points to be welded or fused or across which the cut is to be made; to provide a transformer in which the normally low power factor inherent in such appliances is corrected to raise it to unity or close thereto, so as to prevent or reduce to a minimum line disturbance that results in the case of low power factor; to provide an apparatus of the kind indicated in which power factor correction is accomplished automatically but only during load periods and without the use of switches or other mechanical means, so that during periods of inactivity there may be no absorption of charging current from the line with its attendant increase in operating expense; and to provide a transformer which is of comparatively simple form, which will, among other things, make possible the welding operation by practically direct contact of the electrode with the work, even where the former is subjected to a pressure of five pounds or more, thus reducing to a minimum the skill necessary to be exercised by the operator, which will effect such deep penetration in the performance of the welding function, whether the metal be of the hardness of file steel or of the character of the softer ferrous metals or aluminum or copper or bronze, brass or other commercial alloys, as to complete the weld in a single movement of the electrode across the work, which will operate with equal success with both bare or coated electrodes, which has an open circuit voltage that is low enough not to constitute any hazard to the operator but at the same time sufficient as a striking voltage to start the welding operation, and which will maintain the maximum efficiency of operation without liability of failure to function with all metals and under all conditions of use even though the point of contact of the electrode with the work be subjected to a strong air blast or the effects of a magnetic field.

With this object in view, the invention consists in a construction and combination of parts of which a preferred embodiment is illustrated in the accompanying drawing in which the figure is a diagrammatic view of a transformer embodying the features of the invention.

The core 10 which, of course, is laminated in accordance with the conventional practice, is generally in the form of a rectangular frame of which the ends constitute the legs 11 and 12, the core having a central leg 13 disposed intermediately between the legs 11 and 12 but spanning the two side members of the frame and dividing them respectively into legs 14, 15, 16 and 17.

The primary winding 18 is wound on the legs 14, 12 and 16 and its leads are carried to an energizing source which may be the conventional 220 volt system or a specially provided higher voltage system, say 550 volts.

The winding 19 is wound on the legs 15, 11 and 17 and is generally like the primary winding although probably not materially influenced by the primary winding except indirectly as it may be through the secondary winding. The winding 19 is the exciter winding for the capacity 20 which is in the form of a bank of condensers to the terminals of which the extremities of the exciter winding are connected.

The secondary winding 21 is wound at least on the legs 11 and 12 and may, if desired, include a serially connected section 22 wound on the center leg 13. Although the center section is not absolutely essential to satisfactory performance, it possesses certain advantages from the viewpoint of convenience in regulation, since it is provided with the taps 23 with any one of which may be engaged the movable tap 24 carried by one terminal of that section of the secondary mounted on the leg 11.

The terminals of the secondary are connected, as in the usual practice, one with the work 25, as by a ground clamp or its equivalent and the other with the electrode holder 26.

By reason of forming the core with a center leg and giving that a greater cross-section than any of the remaining legs, the core is in effect divided into two sections to each of which the center leg 13 is common, so that the capacity circuit wound on the one and the primary energizing circuit wound on the other are, as a practical proposition, relatively substantially isolated and are only placed in inductive relation when the secondary is closed because of the coupling function which the latter performs by reason of being common to both of the core sections. In this way, during periods of inactivity of the transformer, as when the secondary is on open circuit, the latter will perform no coupling function and the current in the primary will drop to its open circuit minimum and there will be no absorption of condenser charging current from the line. When the secondary is closed, however, the capacity circuit will react on the primary circuit, as well as on the secondary circuit and thus correct, by raising almost to unity, what would otherwise be, and is in conventional apparatus, a very poor power factor. Thus the core shape and the distribution of the windings thereon provide only for the use of the correcting capacity during load intervals on the secondary, there being no absorption of charging current from the line when the secondary is not under load. And this without the use of switches or other mechanical appliances with their attendant likelihood of failure.

But practical experience with the invention indicates that the capacity 20 has another function than that of power factor correction for in service apparently there is a plurality of frequencies as well as a plurality of phases in the secondary circuit and possibly a pulsating direct current. Whatever the reason, the current available in the secondary, when used for electric welding effects the deposition of the weld metal in a manner that leaves the weld free from oxidation, blow holes or worm holes, the welding operation being carried out with the welding electrode in direct contact with the work and with such deep penetration that the electrode need be drawn but once across the work. And the electrode may be of plain uncoated metal or the conventional coated electrode may be used if desired.

Not only is practical contact welding possible with the secondary current but the welding operation may be carried out with the work submerged in water or with water flowing over the points to be welded, and the texture of the resulting joint and body metal will be homogeneous.

Another advantage of the invention is the very low open circuit voltage of the secondary, this, for normal welding transformers, being from 40 to 60 volts. Yet with this particular invention this voltage is a sufficient striking voltage to start the welding operation and constitutes no hazard to the operator.

Voltage regulation of the secondary to secure the proper welding current for the particular work in hand is secured by adjustment of the movable tap 24 over the stationary taps 23, thus including or cutting out sections of the secondary winding.

Still another advantage of the invention is the flat top voltage wave which it produces in the secondary, oscillograph records showing that the secondary voltage rises instantly to a maximum and maintains that maximum throughout the alternation, changing to the opposite maximum instantly and maintaining that maximum throughout the succeeding alternation. This result is in large part due to the independent oscillating circuit consisting of the capacitance and its exciting winding.

The invention having been described, what is claimed as new and useful is:

1. In combination with a transformer having a normally low power factor and including a primary and secondary, a reactance of a character to materially improve the power factor, and an energizing winding for the reactance inductively related only to the secondary to automatically render the reactance effective only when the secondary is under load.

2. A transformer comprising primary and secondary windings inductively related of which the former is designed for connection to an energizing source and the latter to a load, and a power factor correcting capacity having an exciting winding inductively related only to the secondary winding and energized when only the latter is on closed circuit.

3. A transformer comprising a core formed with an intermediate leg to divide the core into sections, a primary winding wound on one section of the core, a capacity exciting winding wound on the other section of the core, both of said windings being excluded from said intermediate leg to inductively isolate the two, and a secondary winding wound on both sections of the core to couple both of the first said windings when the secondary is on closed circuit.

4. A transformer comprising a core formed with an intermediate leg to divide the core into sections, a primary winding wound on one section of the core, a capacity exciting winding wound on the other section of the core, both of said windings being excluded from said intermediate leg to inductively isolate the two, and a secondary winding wound on both sections of the core and on the intermediate leg to couple both of first said windings when the secondary is on closed circuit.

5. A transformer comprising a core formed with an intermediate leg to divide the core into sections, a primary winding wound on one section of the core, a capacity exciting winding wound on the other section of the core, both of said windings being excluded from said intermediate leg to inductively isolate the two, and a secondary winding wound on both sections of the core and on the intermediate leg to couple both of first said windings when the secondary is on closed circuit, the secondary winding having that section on the intermediate leg provided with a series of taps for adjustment to vary the turn ratio with the primary winding and thereby effect adjustment in secondary voltage.

FREDERICK CARLISLE OWEN.